Oct. 11, 1927.
L. W. WEAVER
1,645,364
LIQUID STRAINER FOR ORCHARD SPRAYERS
Filed Oct. 4, 1926
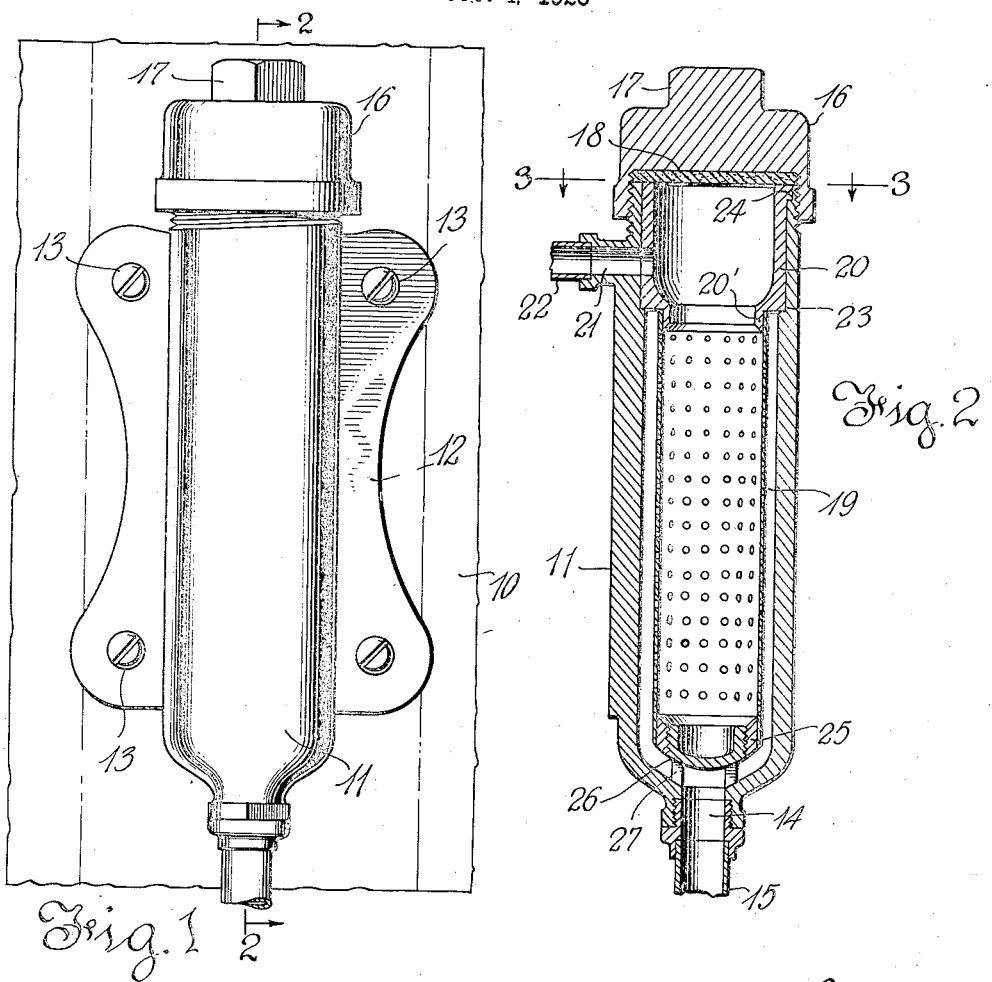
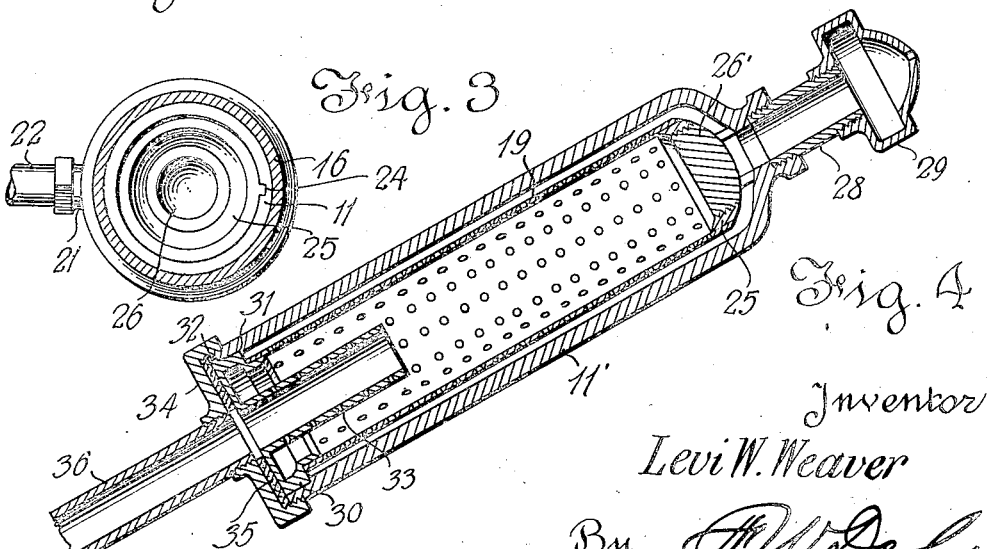
Inventor
Levi W. Weaver
By R. W. Dohw,
Attorney Patented Oct. 11, 1927.

1,645,364

UNITED STATES PATENT OFFICE.

LEVI W. WEAVER, OF ELNORA, INDIANA.

LIQUID STRAINER FOR ORCHARD SPRAYERS.

Application filed October 4, 1926. Serial No. 139,489.

My said invention relates to a liquid strainer intended primarily for use on orchard sprayers, though it is capable of use in various other relations for straining various fluids either liquid or gaseous. It is an object of my invention to provide a device of this character which shall be simple and inexpensive in construction, easily taken apart and easy to clean.

Another object of my invention is to provide a device of this character which can, with very slight changes by used either as a stationary strainer fixed to a barrel, tank, or other receptacle or in connection with spraying means at the end of a hose or the like.

Referring to the drawings, which are made a part of this application, and in which similar reference characters indicate similar parts:

Fig. 1 is an elevation of my device as applied to a fixed container;

Fig. 2, a vertical section on line 2—2 of Figure 1,

Fig. 3, a horizontal section on line 3—3 of Figure 2; and,

Fig. 4, a longitudinal central section of my device combined with spraying means.

In the drawings, reference character 10 indicates a part of the wall of a tank or the like to which my device may be secured. As here shown, the casing 11 is provided with wings 12, having openings to receive screws 13 for attachment of the device to the receptacle. At the lower end the casing is provided with an outlet as shown at 14 leading to a suitable hose or pipe 15. The outlet is shown at the lower end of the casing and the upper end of the casing is closed by means of a cap 16 with a squared head 17 to receive a wrench for loosening or tightening the cap. Packing 18 may be interposed between the cap and the casing.

Within the tubular casing there is a strainer 19, which may consist of sheet metal suitably perforated and which is here shown as forming a tube concentric with the casing, though these parts may take other forms without departing from the invention. At its upper end the strainer surrounds a shoulder 20' of a strainer support 20 to which it is brazed, said support having an opening in line with the inlet 21 of the casing which communicates with a suitable pipe 22 extending to pump or into the receptacle 10. It will be noted that the support 20 has a shoulder at 23 resting on a suitable shoulder on the casing and limiting its downward movement in the casing. At the upper end the support has a small lug at 24 adapted to be located in a corresponding notch in the upper rim of the casing for guiding the support 20 into such a position that the opening in the support will register with the inlet 21.

At the lower end of the strainer a ring 25 is situated inside the strainer and is brazed thereto. A cup 26 has a screw threaded connection with the ring, though it may be otherwise held in place. The cup has a number of legs 27 so positioned as to engage the bottom of the casing near the outlet and preferably standing just outside this outlet passage.

In the form of my invention now under consideration the cup acts as a sediment container and the portion of the ring 25 extending above the cup forms an extension of such container. It will be noted that the sloping surfaces of the upper and lower ends of the ring merge into the inner and outer walls of the cup in such a way that the strainer can easily be cleaned. By having the cup loosely threaded into the ring it can readily be removed when the strainer is taken out for cleaning. In a preferred size of the device the inlet openings in the casing and the strainer support will be of such size that the operator can insert his finger to lift the strainer partly out of the casing.

This device is intended to be used in connection with fruit tree sprayers of any kind from the common barrel hand sprayer to the high powered sprayers run by gasoline engines or otherwise and is to be fastened at any place on the outfit so the water or oil or any liquid used in spraying after leaving the pump goes directly into the strainer by a side entrance into and through an opening through the outer casing and an opening in the support thence downward and outward through the small openings in the solid metal strainer into the narrow channel between the outside casing and the strainer wall extending from the bottom of the strainer support to the bottom of the casing forming one continuous channel between the two of uniform capacity from top to bottom so that the same pressure is continuous in this channel and no sediment will have a chance to lodge therein but will continue its course downward and out through the opening in the center at the bottom which goes directly into the hose to the spray pipe or rod having at its end a nozzle which causes the same to form into a spray either fine or coarse.

In the form of the invention shown in Figure 4 the casing 11' is the same as in the form above described except that the side inlet is omitted. The outlet opens into a tube 28 carrying at its end a suitable spraying nozzle 29, the strainer 19, and the ring 25 being all as above described. Instead of a cup 26, there is a plug 26' threaded into the end of the strainer tube. The strainer at is opposite end slips loosely over a shoulder on a support 30 resting against a shoulder 31 on the casing and having a lug 32 for engagement with a notch in the casing, substantially as in the form first described, the strainer being readily disconnected from the support for convenience in cleaning the strainer. The support 30 has a tubular extension 33 here shown as concentric with the casing and the strainer, this extension coacting with the remainder of the fitting to retain any large particles or any coagulated sediment which may fail to pass through the strainer, the extension 33 being perforated, however, to permit water to recede through it when the open end is higher than the extension. This will occur when the flow of spraying material is cut off, as in spraying trees, etc.

A cap 34 holds the support 30 and connected parts in place; a packing strip being interposed at 35 between the cap and the end of the casing. A length of pipe 36 is threaded into the cap in line with the extension 33, the cap being otherwise similar to cap 16. A strainer or strainers as in Figure 1 can be used on the container for the spraying liquid, no other strainer being used in the container, and by using another strainer as in Figure 4 on the hose, pipe or pipes, perfect service will be had making it possible to run the spraying apparatus all day long without interruption.

A strainer as in Figure 1 can readily be adapted for use as a gasoline strainer for automobiles by providing suitable means for attaching it to a carburetor or the like or by molding the casing in one piece with the carburetor casing or another support. When so used the top cap should be set inside the outer casing or cylinder as a matter of neatness and convenience. For such use the sediment cup should also be deeper so as to collect and retain dirt and water over a considerable period of time. When used for straining gasoline the cup 26 is essential, but when used to spray trees, etc., it will be advantageous in many cases to substitute a plug as 26' for the cup, thus insuring that all the liquid will flow out of the casing though some insoluble matter may remain in the strainer. When a plug is used the lowest holes in the strainer should be on a level with the top of the plug to get the best results. The capacity of the sediment chamber can be increased where a cup is used, by leaving the lower part of tube 19 unperforated, and in the same way a sediment chamber can be provided above the plug when a plug is used.

Assuming that the device operates under a pressure of two hundred pounds, the inlet and outlet openings being one inch in diameter by inside measurement, the cylinder three and one-half inches in diameter by inside measurement, and the strainer being ten inches long from support 20 to ring 25, i. e., having a strainer surface of 90 square inches, then the liquid will have the same speed at the inlet and the outlet as they are of the same size. The cylinder being over three and one-half inches in diameter, the water or other liquid will travel at a rate much slower than at the inlet and outlet due to their smaller diameter.

The large surface of the strainer cuts the pressure down to a minimum compared to the inlet and outlet as it would take only a small part of the strainer to carry the same amount of liquid. In spraying material we find an emulsion of oil and other material of a doughy or sticky nature that heretofore was left in the sprayer because it would not pass thru the strainer at the bottom of the pipe or pump. This substance is a part of the spraying mixture and the agitator in the tank only keeps the liquid stirred up while the pump is running, hence cannot keep all the material in solution by the use of present day machinery.

When no strainer is used in the tank and my liquid strainer is placed on the pump, the liquid being pumped directly to it through the side inlet and passing downward in two separate streams or currents, the one at the inner side of the strainer carrying with it the undissolved particles which are too large to pass through the strainer holes, the liquid in its downward course at the inside of the strainer is constantly wearing down the undissolved particles that hang along the inner strainer wall, being drawn there by the slow current of the liquid passing out of the strainer. In the narrow channel between the cylinder and the strainer wall the second stream passing downward at the same speed and under the same pressure is wearing against the outer wall of the strainer makes the almost perfect liquid into a perfect liquid, wearing all the ingredients into a uniform fineness and leaving all indissoluble material inside the strainer.

By using a cylinder of a larger size than the inlet and outlet openings, thus causing the liquid to run slower in a channel of faster running liquid, and by using within its walls a solid metal strainer, cylindrical in form, forcing a system of horizontal streams of liquid under a lower pressure between two vertical streams of liquid of higher pressure in a downward course, I make an imperfect spraying mixture into a perfect one, clearing its own strainer surface for further duty and leaving all indissoluble matter within the walls of the strainer for subsequent removal.

It will be obvious to those skilled in the art that many changes may be made in my device without departing from the spirit of the invention, and therefore I do not limit myself to what is shown in the drawings and described in the specification but only as indicated in the appended claims.

Having fully described my said invention what I claim as new and desire to secure by Letters Patent is:

1. A fluid strainer comprising a casing, a strainer element concentric with the casing, a cup closing one end of the strainer element said cup having projections spacing it from an outlet at one end of the casing, and an inlet at the other end of the casing for admitting fluid to the casing.

2. In a fluid strainer, a casing, a concentric strainer element, an inlet for admitting fluid to the strainer element, a cup detachably fixed in the lower end of the strainer element, an outlet below the cup, and legs on said cup for spacing it from said outlet.

3. In a fluid strainer, a casing, a concentric strainer element, an inlet at the upper end for admitting fluid to the strainer element, a cup detachably fixed in the lower end of the strainer element, in spaced relation to the bottom of the casing, and an outlet below the cup.

4. A fluid strainer comprising a tubular casing having an annular inner shoulder, a strainer support resting on the shoulder, a tubular strainer fitting at one end about an annular extension of the support said strainer being closed at its lower end and being uniformly spaced from the casing, and an outlet at the bottom of the casing.

5. A fluid strainer comprising a tubular casing, a tubular strainer in the casing, a ring in the lower end of the strainer, a sediment cup supported by the ring with its upper and lower margins merging into those of the cup, an outlet at the bottom of the casing, and legs on the cup resting on the bottom of the casing.

6. In a fluid strainer, a casing having a shoulder, a strainer support fitting in the casing, said support resting on said shoulder, a lug on one of the parts engaging a notch in the other and out of contact with the liquid in the strainer, and a tubular strainer secured to the support.

7. A fluid strainer for spraying liquid and the like comprising an outer casing, a strainer element therein closed at one end said strainer providing a container for the liquid to be strained, an inlet opening into the strainer adjacent one end of the casing, an outlet at the opposite end of the casing, apertures in the strainer element of suitable size and number to retain for a time solids in the liquid, and a passage of relatively small capacity surrounding the strainer element, whereby undissolved particles hung up in the strainer element may be worn down by the relatively rapid flow of liquid inside and outside said strainer element toward the outlet.

8. A fluid strainer for spraying liquid and the like comprising an outer casing having an inlet at one end and an outlet at the other, a strainer element uniformly spaced from the wall of the casing and closed at the outlet end of the casing, and apertures in said strainer element so proportioned with reference to the rate of flow inside and outside the strainer as to retain for a time any soluble solids in the liquid whereby the inner and outer fluid currents may substantially atomize such solids.

In testimony whereof I affix my signature.

LEVI W. WEAVER.